US010187928B2

(12) United States Patent
Karandikar et al.

(10) Patent No.: US 10,187,928 B2
(45) Date of Patent: Jan. 22, 2019

(54) METHODS AND SYSTEMS FOR CONTROLLING A SDN-BASED MULTI-RAT COMMUNICATION NETWORK

(71) Applicant: Indian Institute of Technology Bombay, Mumbai (IN)

(72) Inventors: Abhay Karandikar, Bangalore (IN); Pranav Kumar Jha, Gurgaon (IN); Akshatha Nayak M, Bangalore (IN); Nishant Shah, Mumbai (IN); Arghyadip Roy, Midnapore (IN); Ojas Apoorva Kanhere, Ahmedabad (IN); Pola Priyanka, Hyderabad (IN); Abhishek Dandekar, Mumbai (IN); Rohan Kharade, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 57 days.

(21) Appl. No.: 15/582,145

(22) Filed: Apr. 28, 2017

(65) Prior Publication Data

US 2017/0238362 A1 Aug. 17, 2017

(30) Foreign Application Priority Data

Mar. 7, 2017 (IN) ............................ 201721008015

(51) Int. Cl.
*H04W 88/16* (2009.01)
*H04W 92/02* (2009.01)
(Continued)

(52) U.S. Cl.
CPC ........ *H04W 88/16* (2013.01); *H04W 36/0066* (2013.01); *H04W 36/00835* (2018.08);
(Continued)

(58) Field of Classification Search
CPC . H04W 36/0066; H04W 36/08; H04W 48/18; H04W 88/16; H04W 92/02
(Continued)

(56) References Cited

U.S. PATENT DOCUMENTS 8,971,243 B2 * 3/2015 De Pasquale .......... H04B 7/022 370/328
10,142,894 * 11/2018 Himayat ........... H04W 36/0066
(Continued)

*Primary Examiner* — Stephen J Clawson
(74) *Attorney, Agent, or Firm* — Mannava & Kang, P.C.; Vinay Malik

(57) ABSTRACT

Methods and systems for controlling an SDN-based multi-RAT communication network. Embodiments herein disclose a wireless communication system, which can support/enable services that are currently being provided by multiple wireless communication systems. Embodiments herein disclose a wireless communication system based on SDN (Software Defined Networking). Embodiments herein disclose a network comprising of a generic control plane node. Embodiments herein disclose a method for communication between the proposed wireless communication system and existing UEs that are in use in today's 3GPP-LTE networks or IEEE 802.11 based WLANs without any changes in the mobile communication protocol. Embodiments herein disclose a method for providing services to the users, such as handover of a device from WLAN to 3GPP-LTE and vice versa.

23 Claims, 17 Drawing Sheets

WNC 101
LTE BS 202
Controller Interface
Radio Tower
Towards CN
LTE UE
Mobility Anchor Gateway MAGW 301
Packet Network Gateway PNG 302
WLAN BS 203
WLAN UE (STA)
L3
L2
L1
Data Network
RATn BS
RATn UE
Data Path

(51) Int. Cl.
*H04W 36/00* (2009.01)
*H04W 36/08* (2009.01)
*H04W 48/18* (2009.01)

(52) U.S. Cl.
CPC ............ *H04W 36/08* (2013.01); *H04W 48/18* (2013.01); *H04W 92/02* (2013.01)

(58) Field of Classification Search
USPC .......................................................... 370/328
See application file for complete search history.

(56) References Cited

U.S. PATENT DOCUMENTS

2016/0150448 A1* 5/2016 Perras ................... H04W 36/12 455/450
2016/0352731 A1* 12/2016 Mentze ............... H04L 12/6418
2017/0181021 A1* 6/2017 Yoon ..................... H04W 24/08

* cited by examiner

METHODS AND SYSTEMS FOR CONTROLLING A SDN-BASED MULTI-RAT COMMUNICATION NETWORK

CROSS REFERENCE TO RELATED APPLICATIONS

This application claims priority from, IN Application Number 201721008015, filed on Mar. 7, 2017, the disclosure of which is incorporated by reference herein.

TECHNICAL FIELD

Embodiments disclosed herein relate to multi-RAT (Radio Access Technology) based wireless communication network and more particularly to controlling a multi-RAT based wireless communication network using SDN (Software Defined Networking).

BACKGROUND

Different wireless communication systems are being deployed to provide wireless broadband access, for example, 3GPP-LTE (3rd Generation Partnership Project-Long Term Evolution), 3G-UMTS (3rd Generation-Universal Mobile Telecommunications System), IEEE's (Institute of Electrical and Electronics Engineers) 802.11 based WLANs (Wireless Local Area Networks), and so on. These systems support different Radio Access Technologies (RATs) and also have different network architectures. They also provide different types of services to subscribers and use different communication protocols. In some cases, the network architectures are proprietary and/or vendor-specific. Unfortunately, these networks are controlled and managed separately, and there is little harmonization in these processes, which increases the operation and management overheads substantially. Since the configuration and management of these different RAT based networks are handled separately and in isolation to each other, it also results in a sub-optimal network performance.

OBJECTS

The principal object of embodiments herein is to disclose a single wireless communication system, which can support/enable services that are currently being provided by multiple wireless communication systems.

Another object of the embodiments herein is to disclose a wireless communication system based on SDN (Software Defined Networking).

Another object of the embodiments herein is to disclose a network comprising of generic control plane nodes.

Another object of the embodiments herein is to disclose a method for communication between the proposed wireless communication system and existing UEs (User Equipments) that are in use in today's 3GPP-LTE networks, IEEE 802.11 based WLANs or any other RATs without any changes in the mobile communication protocol.

Another object of the embodiments herein is to disclose a method for providing services to the users, such as handover of a UE from WLAN to 3GPP-LTE and vice versa.

BRIEF DESCRIPTION OF FIGURES

Embodiments disclosed herein are illustrated in the accompanying drawings, throughout which like reference letters indicate corresponding parts in the various figures.

The embodiments herein will be better understood from the following description with reference to the drawings, in which.

DETAILED DESCRIPTION

Figure 1:
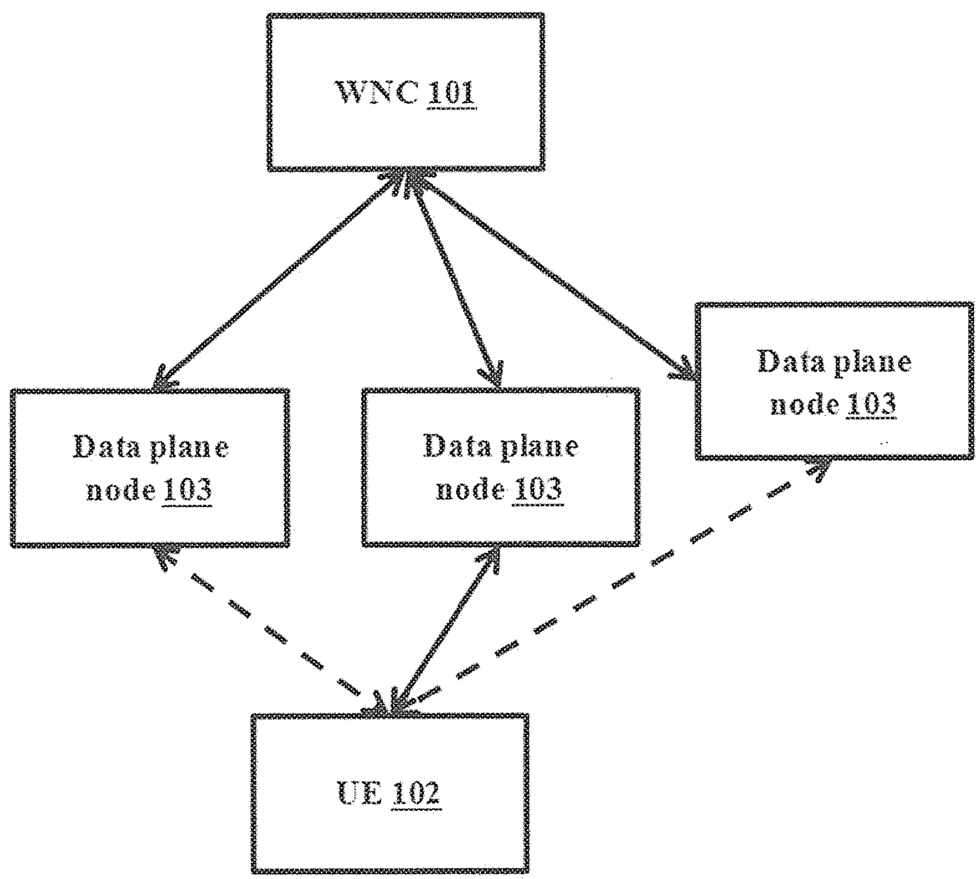
FIG. 1 depicts a communication system comprising of at least one UE, a WNC and a plurality of data plane nodes, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a wireless communication system, which can support/enable services that are currently being provided by multiple wireless communication systems. Referring now to the drawings, and more particularly to FIGS. 1 through 9, where similar reference characters denote corresponding features consistently throughout the figures, there are shown preferred embodiments.

Embodiments herein disclose a wireless communication system, which can support/enable services that are currently being provided by multiple wireless communication systems. Embodiments disclosed herein enable use of a single wireless communication system to provide services to subscribers that are currently being provided by different wireless communication systems such as 3GPP-LTE Third Generation Partnership Project's (3GPP) Long Term Evolution (LTE), 3G-UMTS's Third Generation-Universal Mobile Telecommunication System (3G-UMTS) or IEEE 802.11 based WLAN Institution for Electrical and Electronics Engineers' (IEEE's) 802.11 based Wireless Local Area Network (WLAN) systems and so on.

Embodiments herein disclose a wireless communication system based on SDN (Software Defined Networking). Embodiments disclosed herein comprise of a network comprising of a generic control plane entity hereinafter referred to as a Wireless Network Controller (WNC) and data plane nodes. The WNC can perform all the functions of the control plane, as typically performed by the entities present in each of the connected communication networks. The entities, which are typically used to perform both control plane and data plane functionalities (such as base stations, gateways, and so on), perform only data plane functions. This reduces the complexity of these entities.

Embodiments herein disclose a method for communication between the proposed wireless communication system and existing UEs that are in use in today's 3GPP-LTE networks or IEEE 802.11 based WLANs without any changes in the mobile communication protocol.

Embodiments disclosed herein can support multiple Radio Access Technologies (RATs), the existing as well as future technologies like 5G (Fifth Generation wireless communication technology).

Embodiments herein disclose a method for providing services to the users, such as handover of a device from WLAN to 3GPP-LTE and vice versa.

Embodiments herein disclose interfaces between various network nodes (control plane and data plane nodes) of the wireless communication system.

FIG. 1 depicts a communication system comprising of at least one UE, a WNC and a plurality of data plane nodes. The WNC 101 can be connected to a plurality of data plane nodes 103. Examples of data plane nodes 103 can be, but not limited to base stations, gateways, and so on. Examples of base stations can be a base station corresponding to any RAT. Each of the data plane nodes 103 can correspond to a RAT. The data plane nodes 103 can forward user plane data towards network end-points. The WNC 101 can be connected to at least one UE 102; wherein the WNC 101 will enable the UE 102 to control the flow of data related to at least one service using at least one of the data plane nodes 103 connected to the WNC 101.

The WNC 101 can exchange control plane messages with the UE 102. The WNC 101 can manage the data plane nodes 103 and provide configuration(s) for the flow of data through them. The WNC 101 can exchange control plane messages with entities, such as other peer controllers (other WNCs), GWs and/or control plane nodes of other RATs.

The data plane node 103 can manage the communication with the UEs over the radio interface. The data plane node 103 is responsible for communication between the UE 102 and the WNC 101 for signaling/control plane messages. The data plane node 103 is responsible for communication between the UEs 102 and other data plane nodes (such as Gateways) for user plane data (such as application specific data, (for example, Voice Over Internet Protocol (VOIP), video streams, Hyper Text Transfer Protocol (HTTP) packets, and so on). Managing can comprise of the data plane node 103 forwarding the user plane data to the destination(s) or at least one intermediate point, forwarding the configuration received from the WNC 101 to the UE, and so on.

Figure 2A:
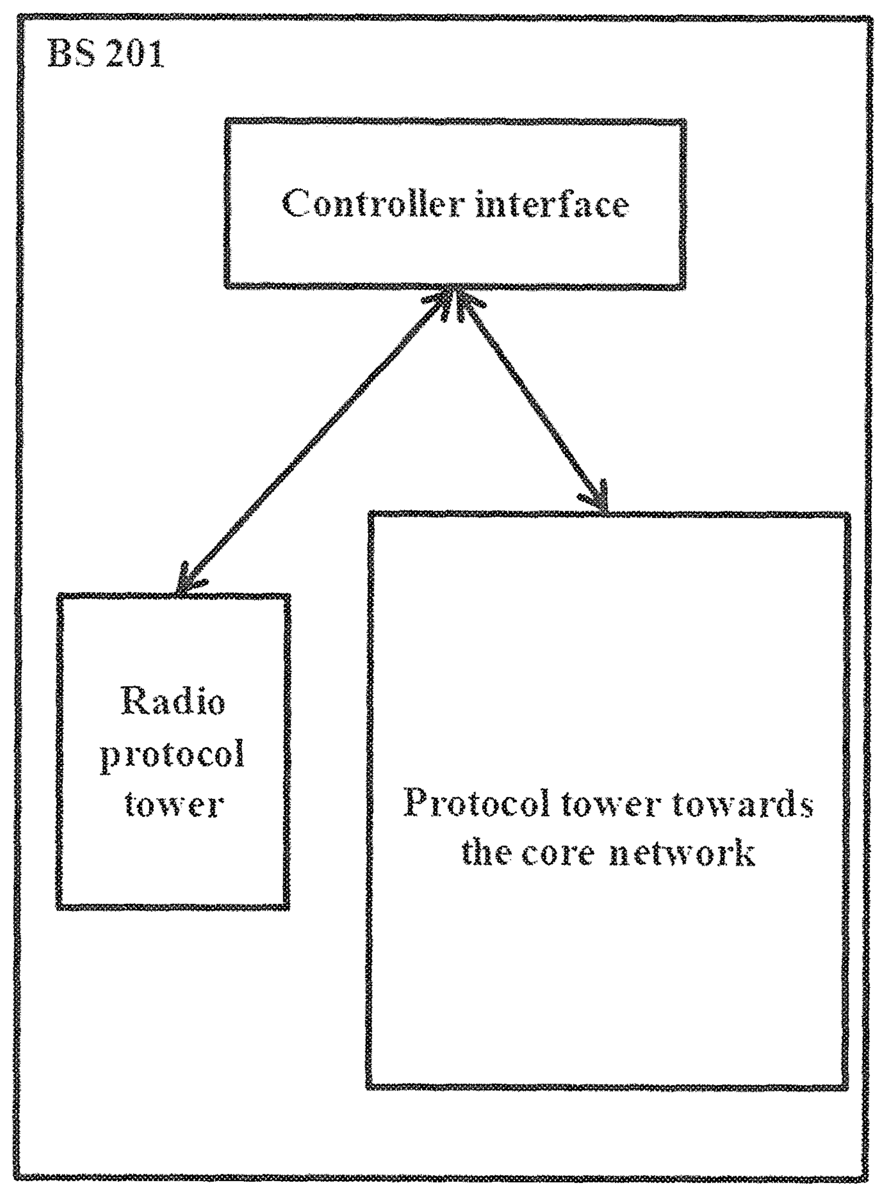
FIGS. 2*a*, 2*b* and 2*c* depict examples of base stations as data plane nodes, according to embodiments as disclosed herein.
Figure 2B:
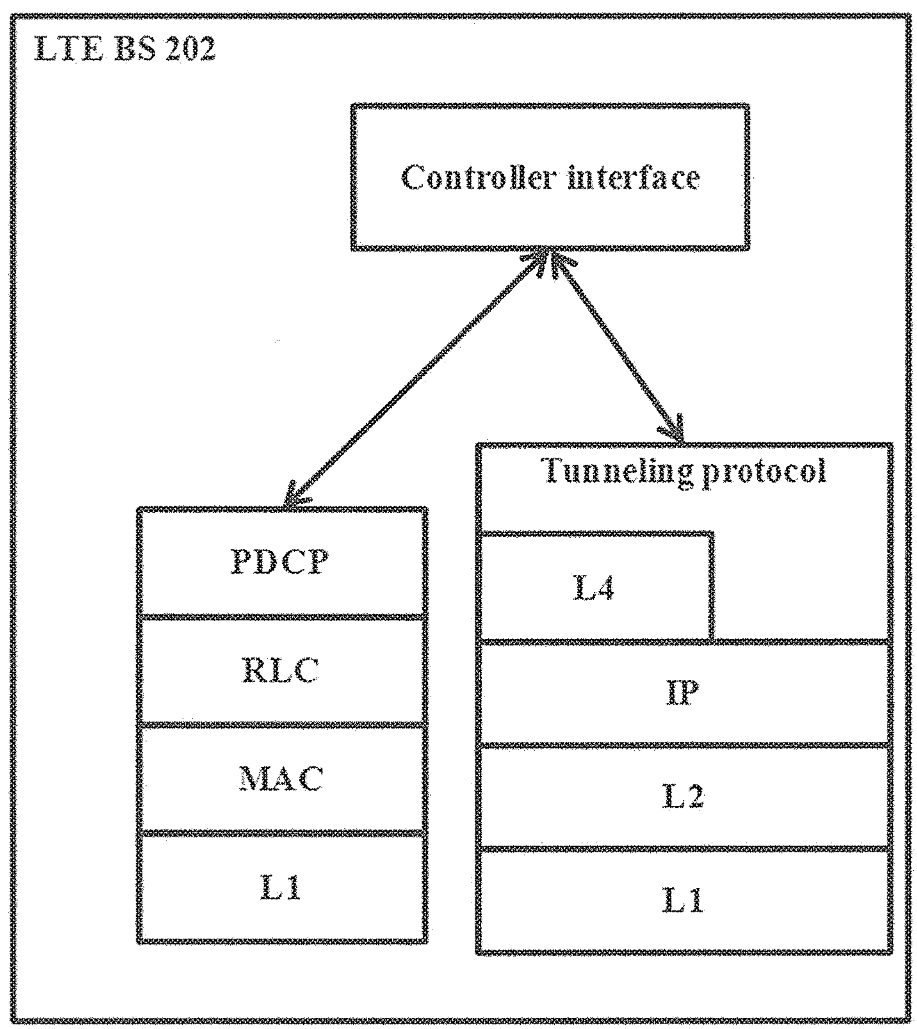
Figure 2C:
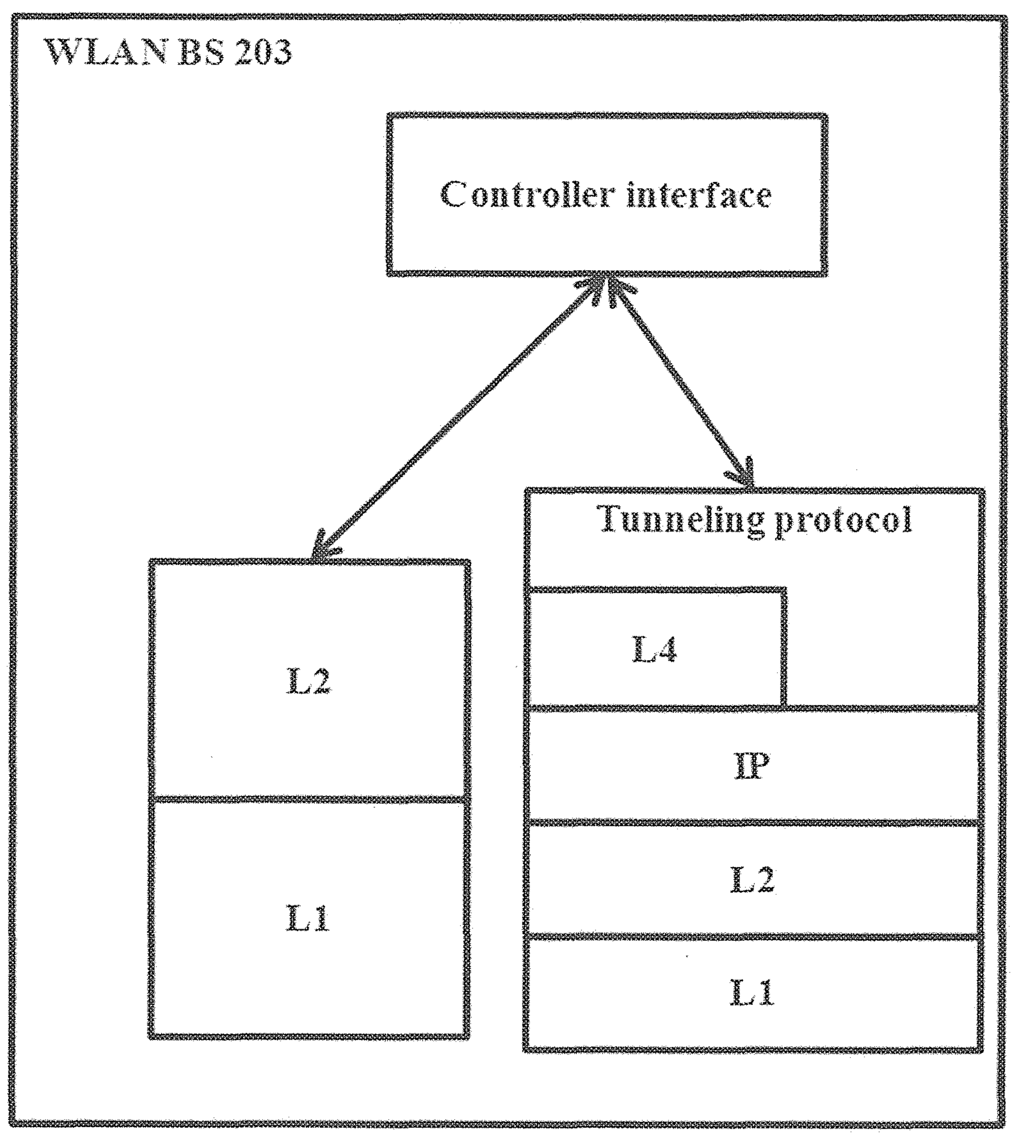

Consider an example wherein the data plane node 103 is a base station (BS). The BS is a forwarding (data) plane node, which performs data forwarding. The BS can also manage communication with the UEs 102, over the radio interface. The BS can support RAT specific radio communication protocol layers. For every supported RAT, a specific type of BS is required. A generic BS 201 has been shown in FIG. 2*a*. For example, different types of BSs with their RAT specific protocol layers have been shown in FIGS. 2*b* and 2*c*. The BS comprises of two protocol towers, a first protocol tower for communicating with the UE and a second protocol tower for communicating with the core network. The UE facing stack is RAT specific in nature. For example, the protocol stack of the LTE Base Station 202 (as depicted in FIG. 2*b*) towards the UE side comprises of PDCP (Packet Data Convergence Protocol), RLC (Radio Link Control), MAC (Media Access Control) and PHY (Physical) layers. The protocol stack of the WLAN Base Station 203 (as depicted in FIG. 2*c*), the protocol stack comprises of the L2 (MAC) and L1 layers, towards the UE. The protocol stack facing the core network is IP based and switching can be done at Layer 2/3/4, as per the requirement. The BS comprises of an interface for communicating with the WNC 101, which can comprise of receiving configurations related to flow management and other radio parameters and sending statistics to the WNC 101. The interface with WNC 101 can also be used to carry the messages from/to UEs.

Figure 3A:
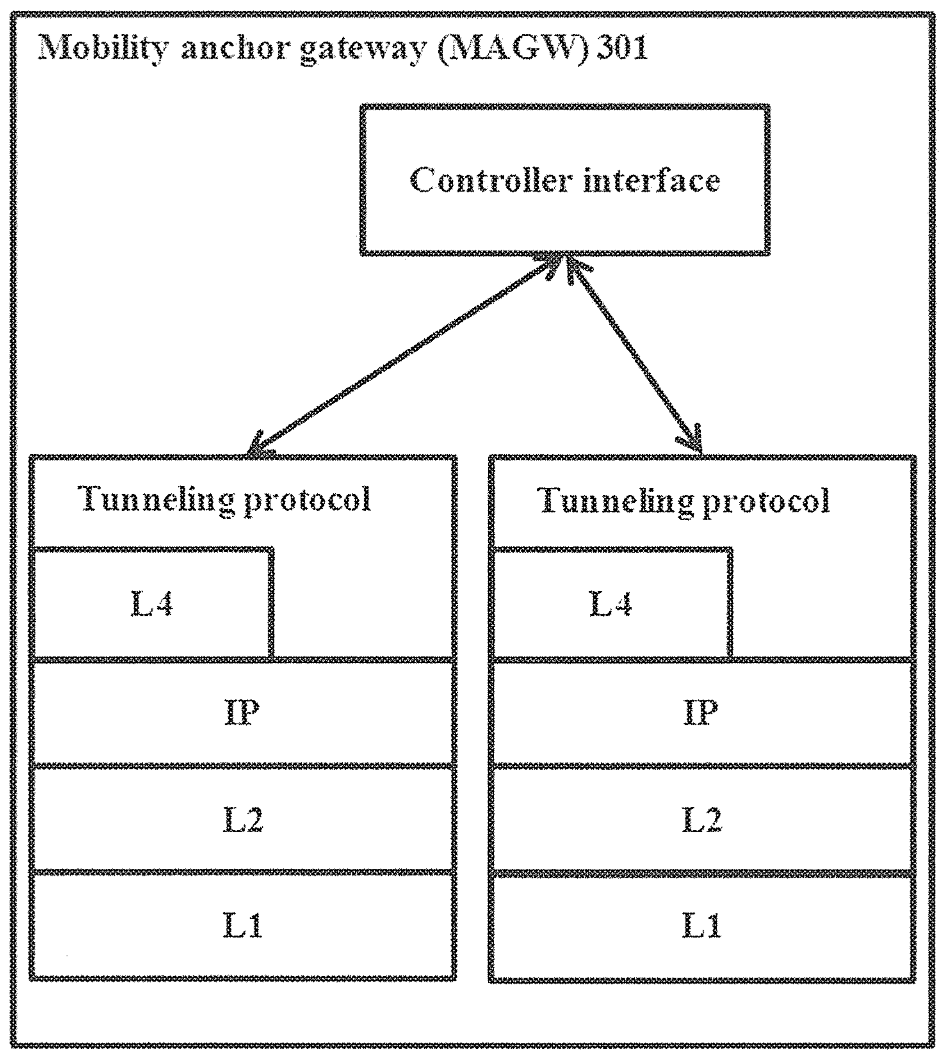
FIGS. 3*a* and 3*b* depict examples of GWs (gateways) as data plane nodes, according to embodiments as disclosed herein.
Figure 3B:
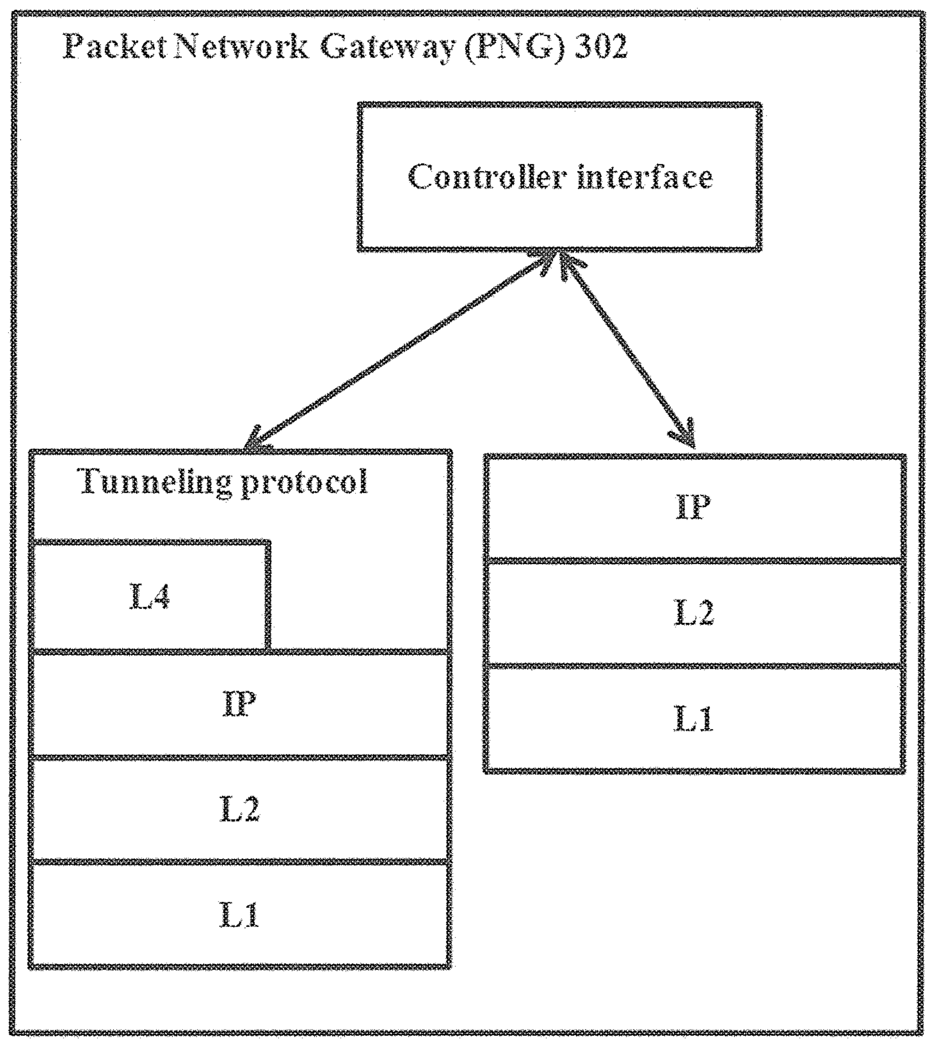

Consider an example where the data plane node 103 is a gateway. Gateways are forwarding (data) plane nodes in the network, which handle packet forwarding for UEs belonging to every supported RAT. Based on the traffic flow (path) configuration provided by the WNC 101, the gateways switch/route and forward packets towards network end points. The gateways have the capability to switch and forward data at different layers, (Layer 2, Layer 3, Layer 4 and so on) and support different protocols. The gateways may have a first interface for interacting with external networks and a second interface for interacting with other data plane nodes (such as a BS) for forwarding data. For the exchange of control messages (typically flow configuration), the gateways can comprise of a third interface towards the WNC 101. FIGS. 3*a* and 3*b* depict two example types of gateways; a MAGW (Mobility Anchoring Gateway) and a PNG (Packet Network Gateway) respectively. As depicted in FIG. 3*a*, the MAGW serves as an anchor point for UE mobility across the wireless network. This gateway interfaces with other data plane nodes (such as a BS) on one side and the PNG on the other side. The PNG serves as an entry point for packet data network to which the UE is connected. For every packet data network, there can be a separate Packet Network Gateway node in the network.

Figure 4:
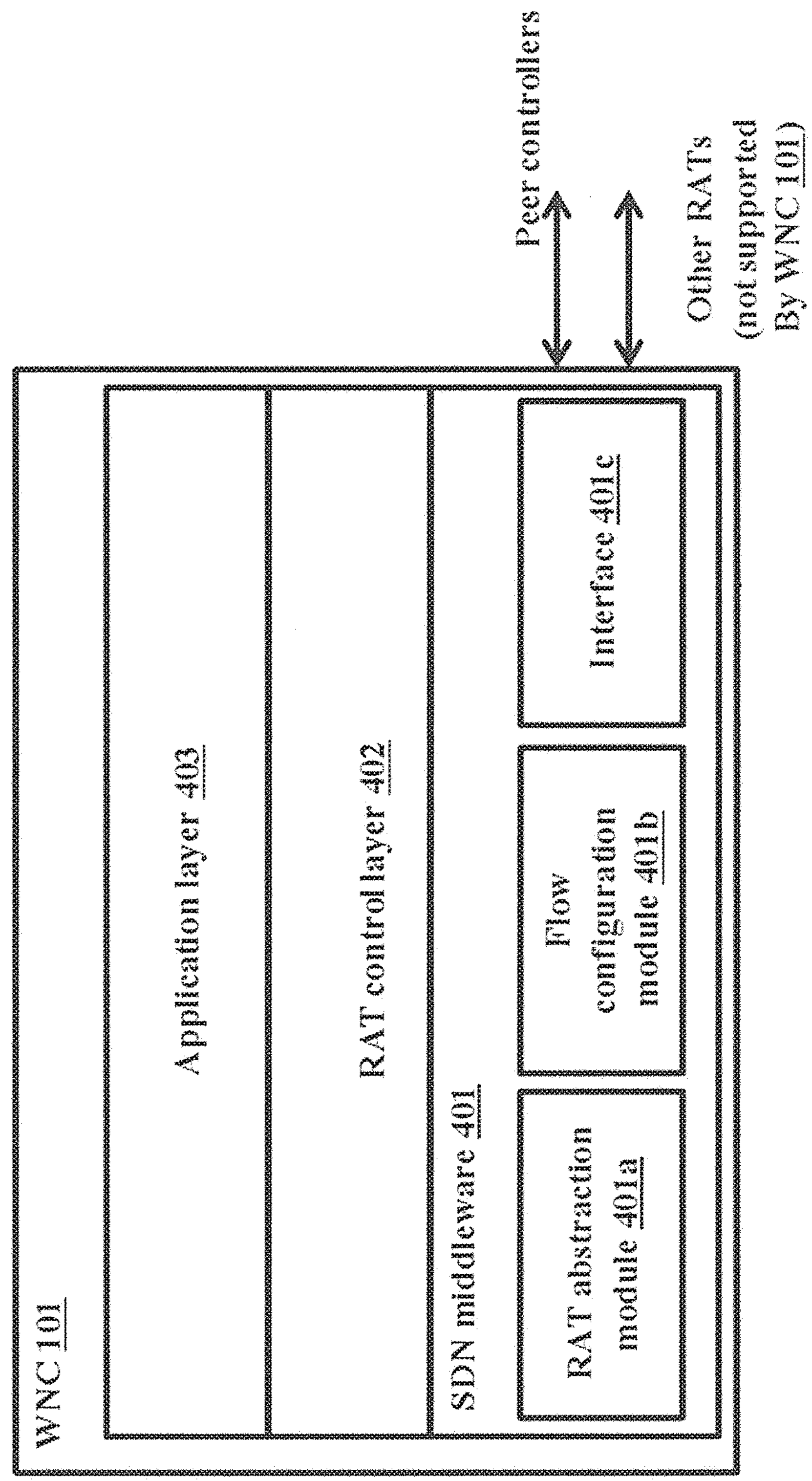
FIG. 4 depicts the WNC (Wireless Network Controller), according to embodiments as disclosed herein.

FIG. 4 depicts the Wireless Network Controller (WNC). The WNC 101 can comprise of three layers: a Software Defined Networking (SDN) middleware 401, a RAT specific control layer 402, and an application layer 403. The SDN middleware 401 manages the interface for communication with data plane nodes 103 and peer-to-peer communication interface with other WNCs and other non-supported RATs. The SDN middleware 401 comprises of a RAT abstraction module 401*a* and flow configuration module 401*b*. The RAT abstraction module 401*a* can translate RAT specific details into a message format that could be used by the flow configuration module 401*b* to configure and setup the traffic flows. The SDN middleware 401 also comprises of an interface 401*c*, towards peer controllers (other WNCs), GWs and/or control plane nodes of other RATs.

The WNC 101 can perform control decisions and configurations for the respective data plane nodes 103. In an example, the WNC 101 can perform Radio Resource Control, as performed typically by a LTE eNB (evolved NodeB).

The RAT specific control layer 402 manages RAT specific control plane logic for control plane communication with the UEs through the BS and/or the data plane nodes 103 (BS). The RAT specific control layer 402 and the BS handle the protocols for communication with the UEs 102. There is one such RAT specific module for each of the RATs supported by the WNC 101.

The application layer 403 manages generic application logic, common to all radio access technologies, admission control, network load balancing, mobility control, power control, interference management, policy configuration, authentication, security configuration and so on.

The WNC 101 can perform functions such as flow (path) configuration at forwarding (data) plane nodes 103, system information broadcast control, RAT specific signaling control, admission control, authentication and subscriber validation, security (such as ciphering, encryption, integrity protection control, and so on), mobility control (idle-mode mobility and connected-mode mobility control), network load balancing, power control and interference management, and scheduling and policy management.

The flow configuration function of the WNC 101 configures the individual data flow properties, such as the Quality of Service (QoS), data rate, flow path and so on.

Broadcast information control allows the WNC 101 to broadcast relevant system information in a network administrative area through the data plane nodes 103 (BS) to allow UEs to discover and connect to the network.

The WNC 101 handles various RATs, which have their individual control signaling mechanism requirements. The WNC 101 is responsible for emulating the RAT specific signaling required for communication with the UEs.

The admission control function of WNC 101 allows it to admit/reject new UEs and new traffic (data) flows into the network. The authentication and subscriber validation functionality of WNC 101 authenticates a UE 102 and validates whether the UE 102 is entitled to a particular service.

The WNC 101 instructs the data plane nodes 103 and the UEs 102 to encrypt the signaling and the data flows passing through the network for enhanced security. It also provides configuration to protect the integrity of the messages.

The WNC 101 is responsible for performing idle-mode and connected-mode mobility management. The WNC 101 can keep track of the location of the UEs 102 in idle-mode and can page the UE 102 if there is a request for the UE 102. In the connected mode, the WNC 101 can manage the handover, when the UE 102 moves across network coverage areas of the BSs.

The WNC 101 can perform network load balancing. The WNC 101 can consider existing load status of the data plane, while admitting/allocating new traffic (data) flows in the network. The WNC 101 can use the load information to re-distribute the flow of traffic from heavily loaded data plane nodes 103 to nodes 103 that are lightly loaded.

The WNC 101 can control the transmit power of the UEs 102 and the data plane nodes 103 (BS) administered by it in order to limit the level of interference in the network and increase the network coverage and capacity.

The WNC 101 can perform scheduling and policy management. There are various types of traffic in the network, which require the network to support different bit rates, delay budgets, packet drop rates and error rates. For example, real time traffic, such as VOIP, video streaming and so on, typically have lower delay budgets, but can tolerate higher error rates whereas http based web browsing sessions can tolerate longer delays, but require lower error rates. The WNC 101 can schedule various types of traffic in the network and tries to ensure that the QoS requirements of different traffic flows are satisfied.

In an embodiment herein, the WNC 101 can be deployed in a Cloud based infrastructure.

Figure 5:
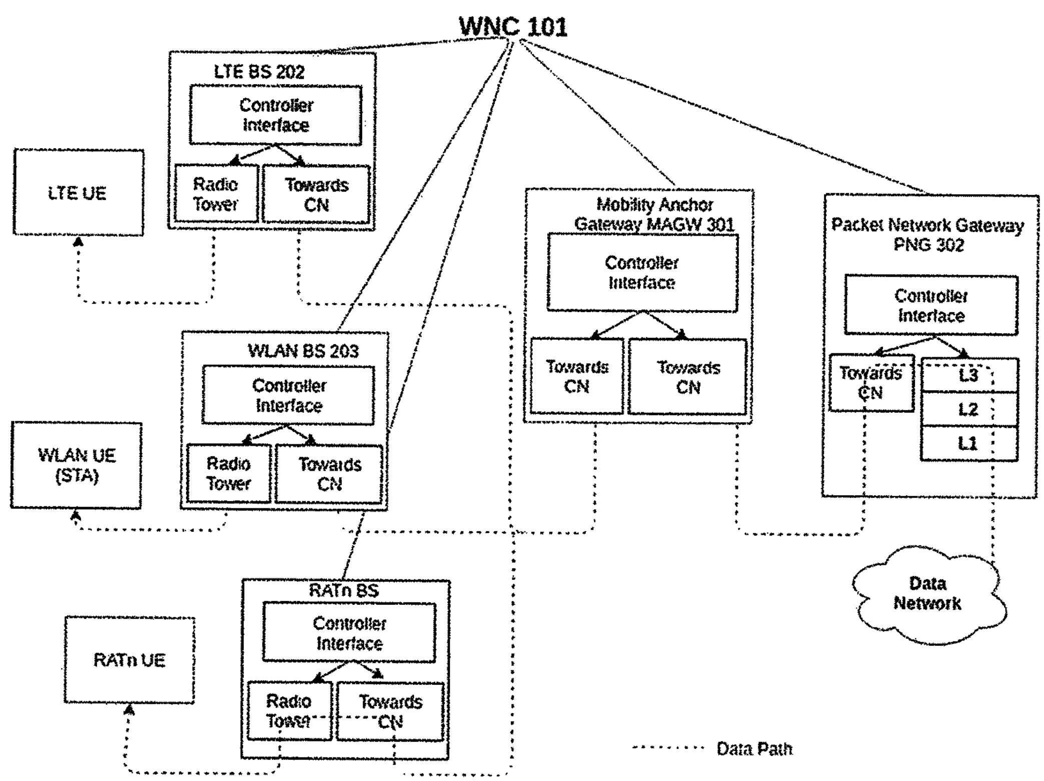
FIG. 5 is an example scenario depicting the interaction between the WNC, the UEs, base stations and gateways, according to embodiments as disclosed herein.

FIG. 5 is an example scenario depicting the interaction between the WNC, the UEs, base stations and gateways. The WNC 101 can be connected to a plurality of BSs and gateways. Each of the BS data plane nodes 103 may correspond to a RAT. The BS and gateways can forward user plane data towards network end-points. The WNC 101 can be connected to at least one UE 102, wherein the WNC 101 will enable the UE 102 to avail services using the BS and the gateways. The WNC 101 can control the BS and the gateway and provide them with configuration(s) for the flow of data through them.

Embodiments herein use the terms "WNC" and "controller" interchangeably and both the terms refer to the WNC 101.

Figure 6A:
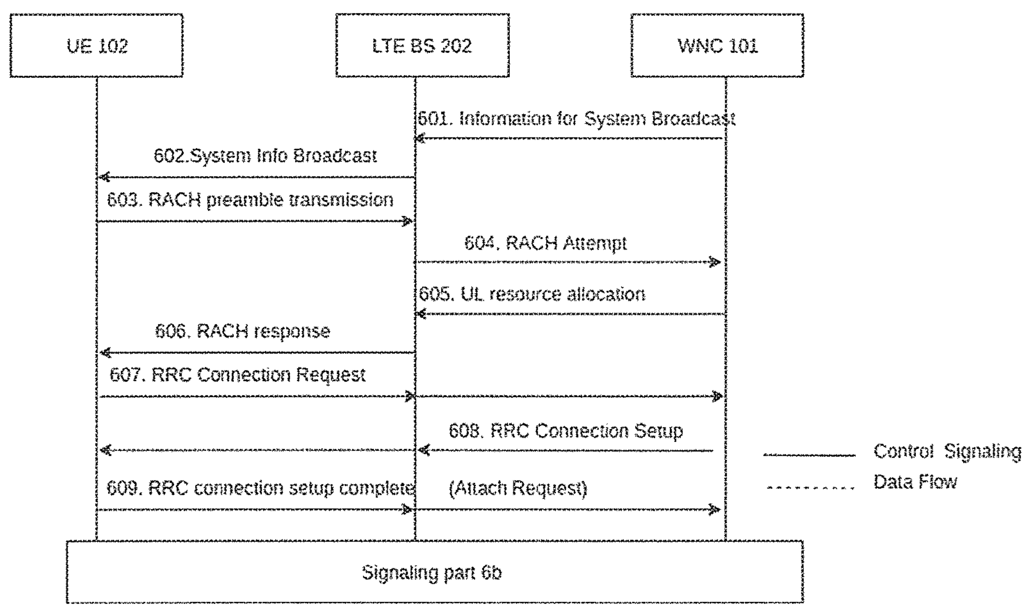
FIG. 6 describes the attach procedure for LTE RAT, according to embodiments as disclosed herein.
Figure 6B:
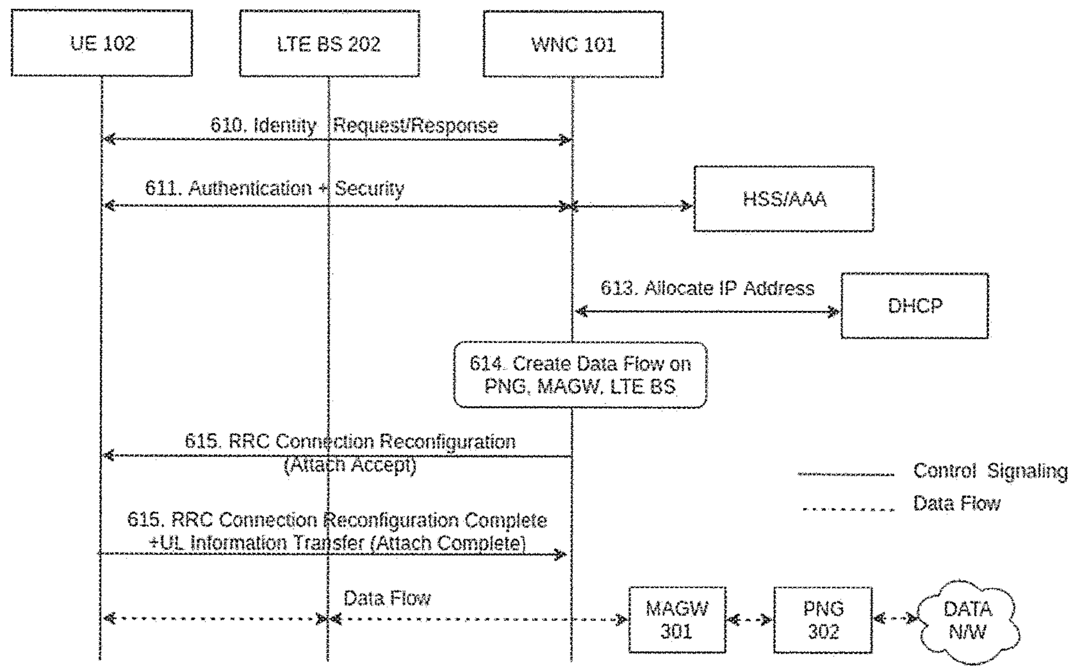

FIG. 6 describes the attach procedure for LTE RAT. The signaling messages between the UE and the network remain unchanged allowing the usage of existing LTE UEs, available in the market, with the wireless communication system proposed here. In step 601, the controller 101 (WNC) sends the details of the System Information Broadcast message (MIB and SIB), synchronization signals, reference signals, and so on to the LTE BS 202. In step 602, the MIB and SIB messages along with the reference and synchronization signals are broadcasted by the LTE BS 202 in the cell administered by it. The MIB and SIB messages contain cell access and other related parameters. When the UE powers on, it synchronizes with the network (a cell in its vicinity) with the help of the above-mentioned broadcast signals and messages (downlink). In step 603, the UE sends a RACH (Random Access Channel) request using a signature sequence called a RACH Preamble, for uplink synchronization and to attach to the network. In step 604, on receiving the RACH Preamble, the LTE BS 202 forwards a RACH attempt to the controller 101. The controller 101 allocates a temporary identity to the UE, which is made permanent after completion of the successful RACH procedure. The permanent identity is hereinafter referred to as CRNTI (Cell Radio Network Temporary Identifier). In step 605, on successful RACH attempt, the controller 101 allocates uplink resources for the UE and sends the allocation message to the LTE BS 202. In step 606, the LTE BS 202 responds to the UE by sending out the RACH response message. The temporary identity along with uplink resources is transmitted to the UE as part of RACH Response (to enable further communication between the UE and the network). In step 607, the UE then sends out an RRC (Radio Resource Control) connection request to the LTE BS 202. The LTE BS 202 is transparent to this message and forwards it to the controller 101. In step 608, the controller 101 transmits the RRC connection setup message in response to the connection request. This contains the configuration details of dedicated signaling radio bearer (used for further over the air communication between UE 102 and LTE BS 202). In step 609, once the RRC connection setup message has been received by the UE, it sends out the RRC connection setup complete message, which contains the attach request. As part of the handling of the RRC connection setup and attach procedures, the controller 101 may initiate an admission control function also and admit a UE only if there are enough resources available to handle the UE. In step 610, the UE sends the UE identity response message containing the IMSI (International Mobile Subscriber Identity), in response to the identity request sent by the controller 101. The UE identity can be transferred in an encrypted manner. In step 611, the UE transmits its configuration as a message to the controller 101, which is then authenticated by the controller 101 by sending it to the Home Subscriber Server (HSS). This message is transmitted only in the absence of UE context in the network, if the attach request was not integrity protected or in case of the failure of integrity check. This is done by the controller 101 in conjunction with the HSS. In step 612, the new controller 101 sends out a delete session request message to the old controller 101 to which the UE was attached, if there are active bearer contexts in the old controller 101 for the particular UE. In response, the old controller 101 deletes the session. In step 613, the controller 101 then sends a DHCP (Dynamic Host Configuration Protocol) Request for UE IP address allocation to the DHCP server. In step 614, the controller 101 configures the data flow paths between the LTE BS 202 and other data plane nodes, the gateways 103 such as MAGW and PNG. The gateways 103 create a new entry in its EPS (Evolved Packet System) bearer context table and returns data flow response with the required information. In step 615, on completion of the data flow path configuration, the controller 101 sends out the RRC connection reconfiguration message (along with the attach accept message) to the UE. This message contains the EPS radio bearer identity and the attach accept message containing the DHCP allocated IP address for PDN (Packet Data Network) connectivity for the UE 102, as specified in step 613. In step 616, the UE 102 replies back to the controller 101 with the RRC connection reconfiguration complete message. Once the UE 102 obtains a PDN Address, the UE 102 can send uplink packets towards the LTE BS 202, which then uses the pre-configured data flow path for transferring the data towards the external PDN through the GWs 103.

Figure 7A:
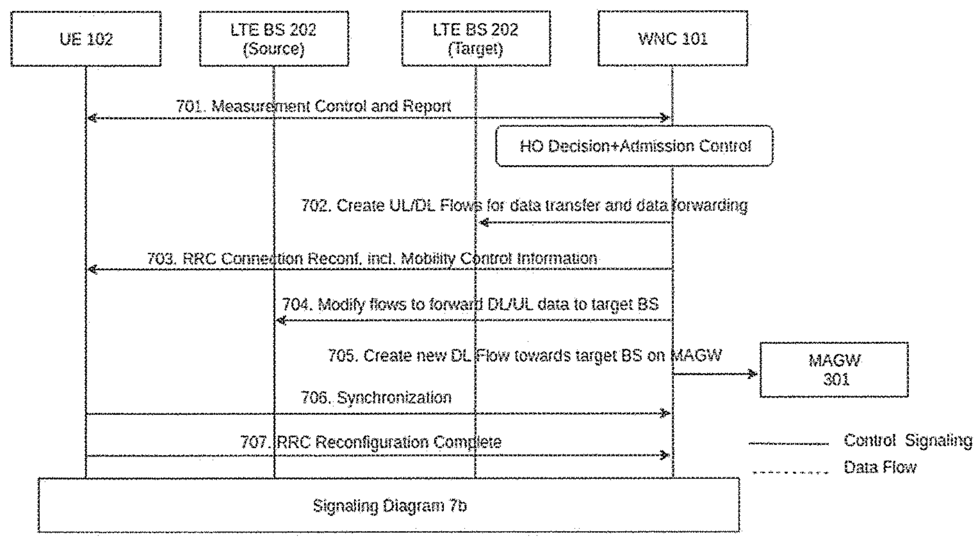
FIG. 7 depicts the procedure for Intra-LTE handover, according to embodiments as disclosed herein.
Figure 7B:
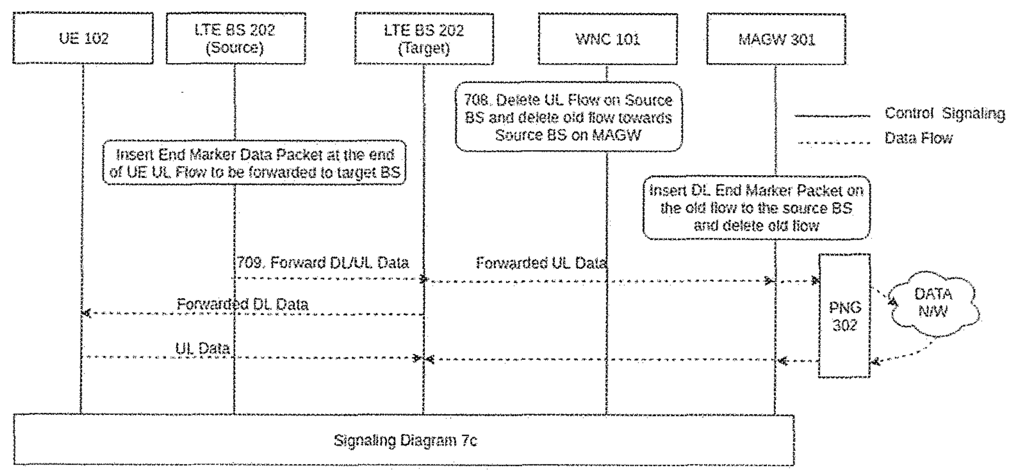
Figure 7C:
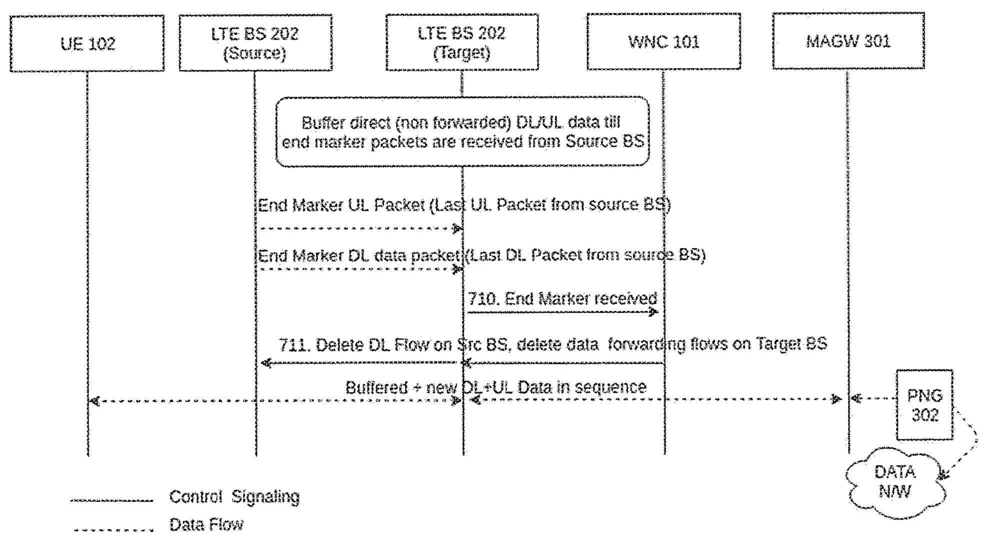

FIG. 7 depicts the procedure for Intra-LTE handover. The procedures depicted in FIG. 7 are carried out when the UE is mobile and handover occurs between the two LTE BSs 103. In step 701, the controller 101 gathers the radio statistics from the UE in the form of measurement Report messages through the LTE BS 202. These measurements help in controlling the connection mobility of the UE. The rules set by the controller 101 decide the content of the report. The controller 101 then takes the decision on the target BS 103 to which the UE is to be handed over. The controller 101 performs admission control function and may take the load of the different cells into account before selecting the target cell (BS). In step 702, downlink/uplink (DL/UL) flows are created for data transfer and data forwarding, once the admission control procedure is completed, the controller 101 sets up the data flow configuration in both the UL and DL directions at the target BS. In step 703, RRC connection reconfiguration message including the mobility control information is sent to the UE 102 by the controller 101. In step 704, the controller 101 modifies the DL/UL flows at the source BS 103 for forwarding data from the source BS to the target BS. In step 705, new DL flows to the target BS 103 are created at the MAGW, but the MAGW continues to use the old flow to the source BS till it is asked to delete the old flow by the controller 101. In step 706, the UE synchronizes with the target BS and accesses the target cell using RACH procedure. The UE configures security algorithms to be used in the target cell after deriving target eNB specific keys. In step 707, once the UE 102 has successfully accessed the target cell, it sends an RRC Reconfiguration Complete message to the controller 101 along with the buffer status report through the target BS 103. This marks the end of data DL transmission through the source BS 103. In step 708, the controller 101 then sends a message to the source BS 103 instructing it to delete the UL flows and sends a message to MAGW 301 to delete the old flows towards source BS. Once the above message is received at the MAGW 301, it inserts a DL end marker packet on the old flow towards the source BS 103 and then proceeds to delete the old DL flow. Once the above message is received at the source BS, the source BS inserts an end marker packet at the end of the UE UL flow to be forwarded to the target BS. In step 709, the source BS forwards the UL/DL data for the existing flow to the target BS till it reaches the end marker packets in each direction. The target BS buffers non-forwarded data packets that directly arrive on the UL and the DL until the end market packet from the target BS 103 is received. In step 710, the target BS 103 sends the end marker received notification packet to the controller 101 on receiving the end marker packets. In step 711, the DL data flow on the source BS 103 is deleted along with the data forwarding flows on the target BS 103. The target BS 103 can now transfer buffered as well as new UL/DL data to/from the UE 102.

Figure 8:
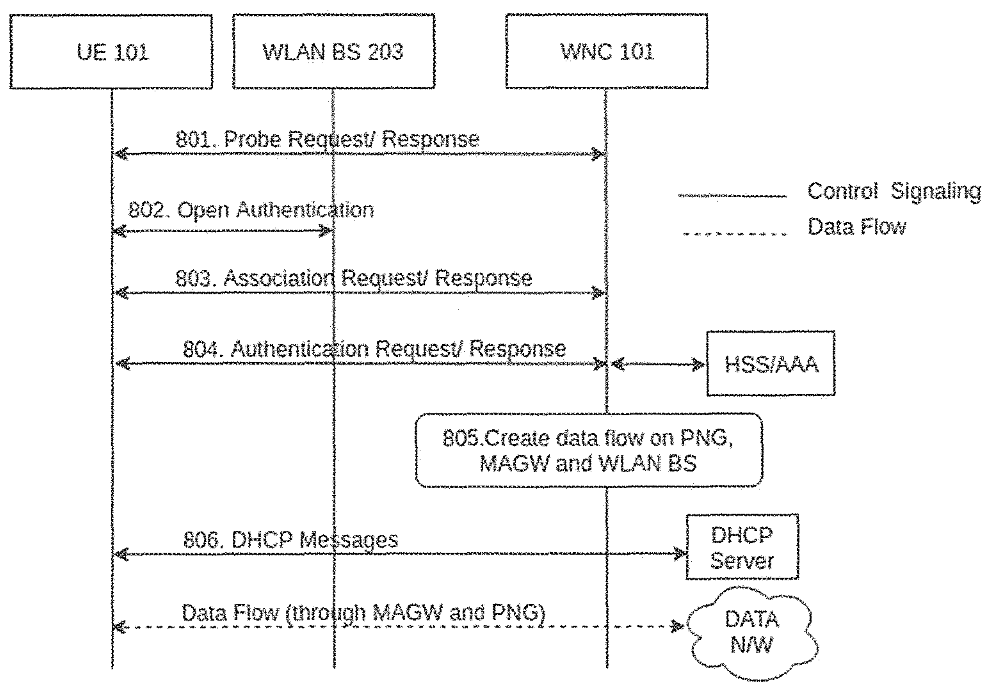
FIG. 8 depicts the WLAN admission procedure, according to embodiments as disclosed herein.

FIG. 8 depicts the WLAN admission procedure. In step 801, a Mobile Station (STA) sends a probe request, when it wants to gather information about other Wi-Fi devices. Embodiments herein refer to the STA and the UE interchangeably and both the aforementioned terms refer to the same device. When an STA 102 wants to join a wireless network, it sends probe requests on a Wi-Fi channel, and waits for a WLAN BS 203 in range, and operating on that channel to respond. If the STA 102 receives no response, it moves on to the next Wi-Fi channel. The WLAN BSs 103 in range respond to this probe request by sending a probe response. The probe response contains the WLAN BS's Service Set Identifier (SSID), supported data rates, and other parameters, based on which the STA 102 decides whether to join the WLAN BS's wireless network. In step 802, any STA 102 that sends an open authentication request, is allowed to connect to the wireless network. In step 803, the STA 102 now attempts to associate with the WLAN BS 203, by sending an association request. The WLAN BS 203 forwards the association request to the controller 101, which then decides whether to allow the STA 102 to connect to the WLAN BS 203. The WLAN BS 203 then conveys the controller 101's decision to the STA 102 using the association response frame. In step 804, the controller 101 transmits identity request messages, to which the STA 102 responds with a response frame, containing an identifier for the STA 102. This identity is verified by the AAA (Authentication, Authorization, and Accounting) server. In step 805, the controller 101 configures data flows at the data plane nodes, the WLAN BS 203, the MAGW 301 and the PNG 302. In step 806, the STA 102 obtains an IP address from the DHCP server and starts using it for further communication.

Figure 9A:
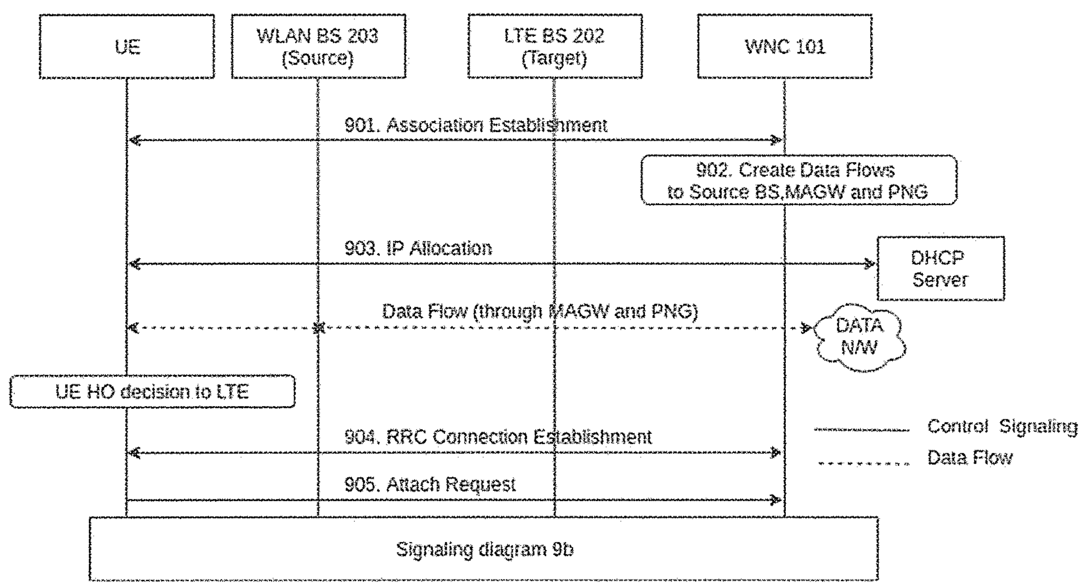
FIG. 9 depicts the WLAN to LTE handover procedure, according to embodiments as disclosed herein.
Figure 9B:
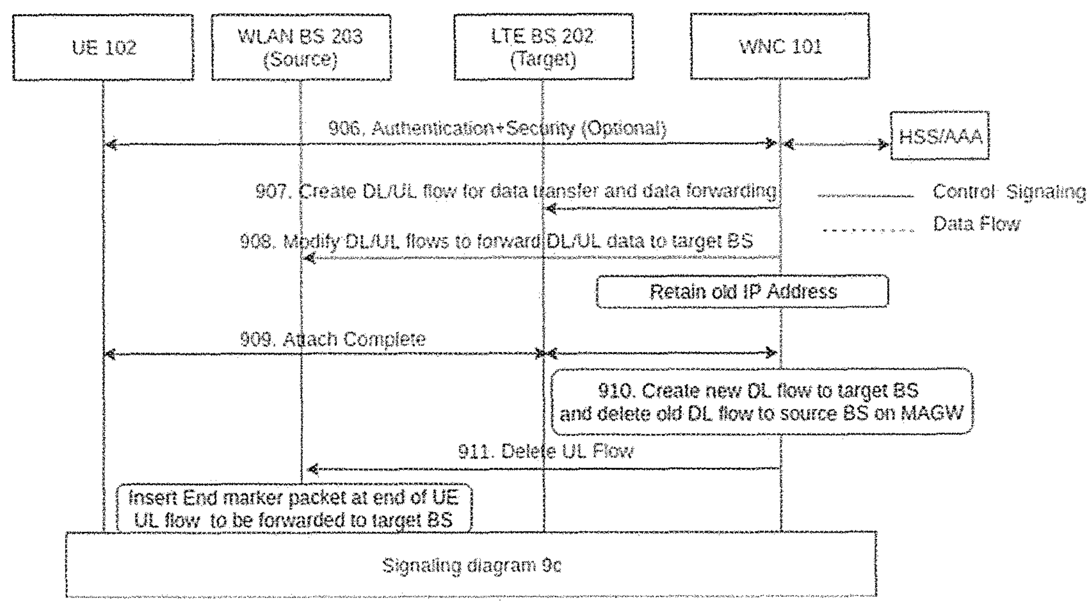
Figure 9C:
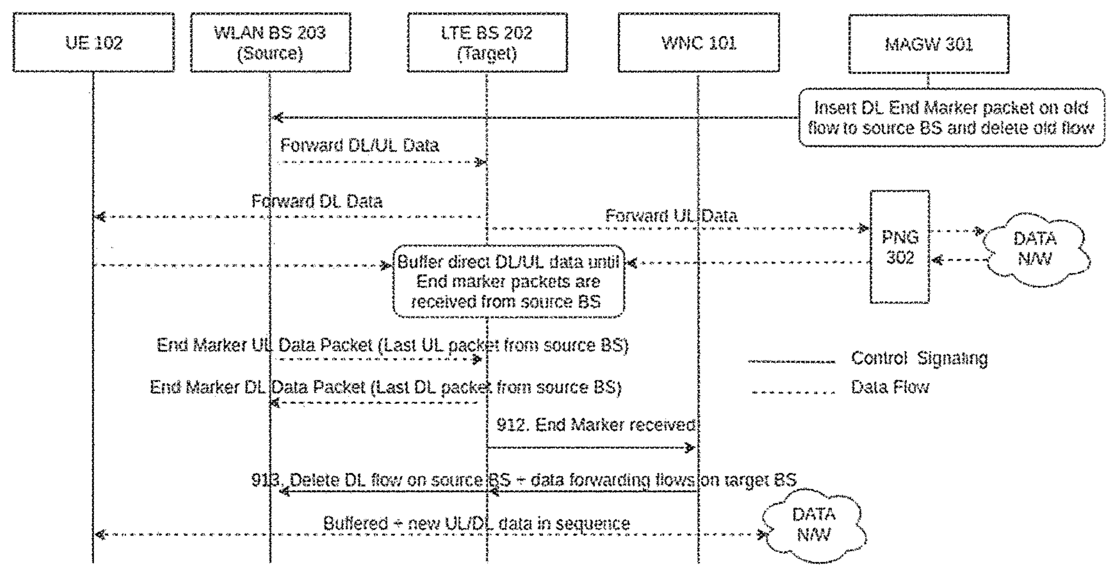

FIG. 9 depicts the WLAN to LTE handover procedure. In step 901, the UE 102 associates with the system through a WLAN BS 203 as described in the WLAN admission procedure. In step 902, the GW 103 are configured such that there exists a data path between the WLAN BS 203 with which UE 102 is associated and the GW 103. In step 903, an IP address is allocated to the UE 102 (based on DHCP discover and DHCP Response). In step 904, a RRC connection is setup between the UE and the network as described in LTE attach procedure of the new network once the UE 102 comes in the vicinity of the LTE BS 202 and decides to handover from WLAN to LTE. In step 905, an attach request is forwarded to the controller 101 in order to modify the data flow path with session continuity. In step 906, in the absence of existing UE context or the lack of integrity protection of the attach request or in case of integrity check failures, authentication and security is setup to activate integrity protection. In step 907, the target LTE BS is configured to forward DL/UL data to/from the UE from/to the network. In step 908, data flows (forwarding tunnels both in UL and DL) are setup between the Source BS (WLAN BS) and the target BS (LTE BS) to forward the data intended for the UE/GW towards the target BS by the source BS so that the data can be delivered in sequence to the UE/GW through the target BS. In step 909, the UE 102 establishes a connection in the LTE network after completing the attach procedure. In step 910, the GWs are configured to create data flow for this UE 102 towards the target BS 103 and delete the old data flow towards the old BS 103. The GW 103 stops forwarding the DL data towards the source BS 103 and starts sending the data towards the target BS 103. It inserts an end marker packet as the last packet towards the source BS in DL before deleting the old DL flow towards the source BS 103. In step 911, the source BS 103 is asked to delete the Uplink (UL) data flow path for the UE 102 towards the GW 103. Before deleting the UL flow, the source BS 103 forwards all UE specific UL data towards the target BS 103 using the forwarding tunnel and inserts an end marker packet at the end to indicate the completion of data transfer. In step 912, after data has been completely transferred from the source BS 103 to the target BS 103 with respect to this particular UE 102, the controller 101 is informed with end marker message by the target BS 103 (after it receives the end marker packets on the forwarding tunnel). In step 913, in response, the controller 101 deletes the forwarding data flows between the target BS 103 and the source BS 103 intended for this particular UE 102.

Embodiments herein disclose a unified, centralized and simplified network architecture, finer/granular control over deployment of policies/services in the network and seamless integration of different radio access technology based networks within a single SDN framework.

Embodiments disclosed herein also bring a simpler forwarding plane architecture along with a unified/centralized control plane architecture, enabling an integrated and harmonized control/management of the network and paving the way for optimized resource utilization and reduced management/operation overheads in the network.

Embodiments disclosed herein result in a well-defined separation between the control and the forwarding (data) planes, facilitating the development of interoperable network equipment.

Embodiments disclosed herein do not require any changes in the existing UE. A UE, compliant to the existing technologies, shall be able to avail all services from the proposed system, which are currently being provided by the existing systems and also exchange existing signaling/data plane messages with the proposed system.

Embodiments herein simplify existing network architectures and unify multiple RAT based systems into a single system. It has the capability to support/enable various RATs at the same time, reducing the need for individual RAT controllers and thus the number of nodes in the network is minimized. Embodiments disclosed herein do not require any change on the UE side, as the signaling from the UE perspective is unchanged. Also, embodiments disclosed herein enable handling of multiple RATs at a single node; more efficient handling of data offloads across RATs and regulation of the network traffic in a better way. Embodiments disclosed herein provide for a centralized control means, hereby enabling functions, such as, network load balancing or interference management to be performed in a more efficient manner, which otherwise require coordination across multiple control plane nodes in the existing networks.

The above centralized architecture also makes it easier to dynamically manage the network by using automation, which is difficult in the current day distributed systems.

The embodiments disclosed herein can be implemented through at least one software program running on at least one hardware device and performing network management functions to control the network elements. The network elements shown in FIGS. 1, 2, 3, 4 and 5 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for managing communication for at least one device connected to at least one Radio Access Technology (RAT) by a Wireless Network Controller (WNC) (101), wherein the at least one RAT comprises of at least one data plane node (103), the method comprising forwarding control plane data to the WNC (101) by the at least one data plane node (103), upon the at least one data plane node (103) receiving the control plane data, wherein the control plane data belongs to a plurality of RATs;

managing control plane data by the WNC (101), upon receiving the control plane messages from the at least one data plane node (103); and managing user plane data by the at least one data plane node (103).

2. The method, as claimed in claim 1, wherein managing the at least one data plane node (103) by the WNC (101) comprises providing at least one configuration to the at least one data plane node (103) for the flow of data through the at least one data plane node (103).

3. The method, as claimed in claim 1, wherein managing the control plane data by the WNC (101) comprises exchanging at least one control plane message with at least one entity, wherein the entity is at least one of peer controllers, gateways and control plane nodes of other RATs.

4. The method, as claimed in claim 1, wherein managing the user plane data by the at least one data plane node (103) comprises forwarding the user plane data to at least one User Equipment (UE) (102) and other data plane nodes (103); and forwarding the at least one configuration received from the WNC (101) to the at least one UE (102).

5. The method, as claimed in claim 1, wherein the at least one data plane node (103) is a Base Station (BS), the BS comprising of a first protocol tower for communicating with the at least one UE (102); a second protocol tower for communicating with a core network; and an interface for communicating with the WNC (101).

6. The method, as claimed in claim 1, wherein the at least one data plane node (103) is a gateway, wherein the gateway comprises at least one of a second interface for interacting with the other data plane nodes; and a third interface for interacting with the WNC (101).

7. The method, as claimed in claim 6, wherein the gateway further comprises a first interface for interacting with at least one external network.

8. The method, as claimed in claim 1, wherein the WNC (101) comprises a Software Defined Networking (SDN)

middleware (401), a RAT specific control layer (402) for each RAT supported by the WNC (101), and an application layer (403).

9. The method, as claimed in claim 8, wherein the SDN middleware (401) comprises a RAT abstraction module (401*a*); a flow configuration module (401*b*); and an interface (401*c*) towards the peer controllers; gateways and control plane nodes of other RATs.

10. The method, as claimed in claim 9, wherein the RAT abstraction module (401*a*) translates RAT specific details into a message format.

11. The method, as claimed in claim 10, wherein the flow configuration module (401*b*) configures and sets-up traffic flows using the translated message format.

12. The method, as claimed in claim 8, wherein the RAT specific control layer (402) manages RAT specific control plane logic for control plane communication with at least one external entity, the at least one external entity comprising at least one UE; and a RAT specific BS data plane node (103).

13. The method, as claimed in claim 8, wherein the application layer (403) manages generic application logic, common to all RATs.

14. The method, as claimed in claim 8, wherein the method further comprises of the WNC (101) performing at least one of configuration of individual data flow properties for the at least one RAT using a flow configuration function;

broadcasting relevant system information in a network administrative area using the at least one data plane node (103) using broadcast information control across the at least one RAT;

emulating the RAT specific signaling required for communication with the at least one UE (102);

at least one of admitting and rejecting the at least one UE (102) and new traffic flows using an admission control function, wherein the admission control function comprises authenticating and validating the at least one UE (102);

instructing the at least one data plane node (103) and the at least one UE (102) to encrypt signaling and the data flows;

performing idle-mode and connected-mode mobility management across the at least one RAT;

performing network load balancing across the at least one RAT;

limiting level of interference in the network and increasing the network coverage and capacity by controlling transmit power of the at least one UE (102) and the BS across the at least one RAT; and performing scheduling and policy management across the at least one RAT.

15. The method, as claimed in claim 1, wherein the method does not require any changes to the at least one UE (102).

16. The method, as claimed in claim 1, wherein the method further comprises performing an attach procedure, when the at least one data plane node (103) is a Long Term Evolution (LTE) BS, the method further comprises sending details of a System Information Broadcast message (MIB and SIB messages), synchronization signals and reference signal by the WNC (101) to the LTE BS (103), wherein the MIB and SIB messages comprises cell access related parameters;

broadcasting the MIB-SIB messages, the reference signals, and synchronization signals by the LTE BS (103) in the cell administered by the LTE BS (103);

synchronizing by the at least one UE (102) with the LTE BS (103) using the MIB-SIB messages, the reference signals, and synchronization signals;

sending a RACH (Random Access Channel) request using a RACH Preamble for uplink synchronization and to attach to the network by the at least one UE (102);

forwarding a RACH attempt to the WNC (101) by the LTE BS (103), on receiving the RACH Preamble from the at least one UE (102);

allocating a temporary identity to the at least one UE (102) by the WNC (101);

allocating uplink resources for the at least one UE (102) by the WNC (101);

sending an allocation message to the at least one LTE BS (103) by the WNC (101);

sending a RACH response message by the LTE BS (103) to the at least one UE (102), wherein the RACH response message comprises of the temporary identity and uplink resources;

sending a RRC connection Request to the LTE BS (103) by the at least one UE (102);

forwarding the RRC connection Request to the WNC (101) by the LTE BS (103);

assigning a permanent identity (Cell Radio Network Temporary Identifier (RNTI) (CRNTI)) to the at least one UE (102) by the WNC (101), upon completion of the successful RACH procedure;

transmitting an RRC Connection Setup message by the WNC (101) in response to the RRC connection Request, wherein the RRC Connection Setup message comprises configuration details of signaling radio bearer;

sending an RRC Connection Setup Complete message by the at least one UE (102), upon receiving the RRC Connection Setup message, wherein the RRC Connection Setup Complete message comprises an Attach Request;

sending a Mobile Equipment (ME) identity Response message by the at least one UE (102) to the WNC (101);

transmitting a configuration of the at least one UE (102) to the WNC (101) by the at least one UE (102);

authenticating the at least one UE (102) by the WNC (101) using a Home Subscriber Server/Authentication, Authorization and Accounting Server (HSS/AAA);

sending a delete session request message to a controller to which the at least one UE (102) was attached by the WNC (101), if there are active bearer contexts in the old controller 101 for the at least one UE (102);

sending a Dynamic Host Configuration Protocol (DHCP) Request for UE IP Address allocation to a DHCP server by the WNC (101);

configuring at least one data flow path between the LTE BS (103) and at least one other data plane node (103);

sending out an RRC connection reconfiguration message to the at least one UE (102) by the WNC (101), upon completion of the data flow path configuration, wherein the RRC connection reconfiguration message comprises an Evolved Packet System (EPS) Radio Bearer Identity and a Packet Data Network (PDN) address;

replying to the WNC (101) with the RRC Connection Reconfiguration complete message by the at least one UE (102);

sending uplink packets to the LTE BS (103) by the at least one UE (102), on receiving the PDN (IP) address; and using the configured data flow path by the LTE BS (103) for transferring the data towards the external PDN through the gateways.

17. The method, as claimed in claim 1, wherein the method further comprises performing intra-LTE handover of a UE (102) from a source BS (103) to a target BS (103), the method further comprises gathering radio statistics from the UE (102) by the WNC (101), wherein the radio statistics can be in the form of measurement Report messages;

deciding the target LTE BS (103) to which the UE (102) is to be handed over by the WNC (101);

performing admission control procedure;

creating downlink/Uplink (DL/UL) flows at the target LTE BS (103) by the WNC (101);

setting up data flow configuration in the Uplink (UL) and Downlink (DL) directions at the target BS (103) by the WNC (101) for receiving the forwarded data from the source LTE BS (103);

performing RRC Connection reconfiguration by the WNC (101);

sending the RRC Connection reconfiguration comprising control information for mobility to the UE (102) by the WNC (101);

modifying DL/UL flows at the source BS (103) for forwarding data from the source BS (103) to the target BS (103) by the WNC (101);

creating new DL flows towards the target LTE BS (103) at a Mobility Anchoring Gateway (MAGW) (301) by the WNC (101);

deleting old flows to the source BS (103) by the WNC (101);

synchronizing with the target BS (103) and accessing a target cell to which the target BS (103) belongs using RACH procedure by the UE (102);

configuring security algorithms to be used in the target cell after deriving target eNB specific keys by the UE (102);

sending an RRC Reconfiguration Complete message to the WNC (101) with a buffer status report by the UE (102), upon the UE (102) successfully accessing the target cell through the target LTE BS (103);

sending a message to the MAGW 301 of the source LTE instructing the MAGW (301) to delete the old DL flow towards source BS (103) by the WNC (101);

inserting a DL end marker packet on an old flow towards the source BS (103) and then deleting the old flow at a gateway (MAGW) (301);

sending a message to the source LTE BS (103) instructing the source LTE BS (103) to delete the UL flow by the WNC (101);

inserting an end marker packet at the end of a UE UL link flow to be forwarded to the target LTE BS (103) by the source LTE BS (103);

forwarding UL/DL data for an existing flow to the target LTE BS (103) by the source LTE BS (103);

buffering non-forwarded data packets that directly arrive on the UL and the DL by the target LTE BS (103), until the end market packet from the source LTE BS (103) is received;

forwarding an end marker received notification by the target BS (103) to the WNC (101);

deleting DL data flow on the source BS (103) and the data forwarding flows on the target BS (103); and transferring of buffered and new UL/DL data from/to the UE by the target LTE BS to/from the gateway (103).

18. The method, as claimed in claim 1, wherein the method further comprises performing a Wireless Local Area Network (WLAN) admission procedure, the method further comprises sending a probe request by a Mobile Station (STA) (102) on a Wi-Fi channel;

monitoring the channel by the STA (102) for a probe response from a WLAN BS (103) in range, and operating on the channel, wherein the probe response comprises of Service Set Identifier (SSID) of the WLAN BS (103), and supported data rates;

attempting to join the WLAN network of the WLAN BS (103) by the STA (102), by sending an Association Request;

forwarding the request to the WNC (101) by the WLAN BS (103);

deciding by the WNC (101) whether to allow the STA (102) to connect to the WLAN BS (103);

communicating decision of the WNC (101) to the STA (102) using an association response frame;

transmitting identity request messages by the WNC (101) to the STA (102);

sending a response frame to the WNC (101) by the STA (102), upon receiving the identity request messages, wherein the response frame comprises an identifier for the STA (102);

configuring data flows at the data plane nodes (103), the WLAN BS, and the gateways by the WNC (101);

obtaining an IP address from the DHCP server by the STA; and using the configured data flow path by the WLAN BS (103) for transferring the data towards the external PDN through the gateways.

19. The method, as claimed in claim 1, wherein the method further comprises of performing a WLAN to LTE network handover procedure for a UE (102), the method further comprises configuring a gateway (GW) and the WLAN BS (103) by the WNC (101) such that there exists a data path between the WLAN BS (103) with which the UE (102) is associated and the GW;

allocating an IP address to the UE (102) by the WNC (101) based on DHCP discover and DHCP Response;

setting up a RRC connection between the UE (102) and the WNC (101) through a target LTE BS (103);

forwarding an attach request to the WNC (101) by the UE (102);

setting up data flows between the WLAN BS (103) and the target LTE BS (103) to forward the data intended for the UE (102) towards the target LTE BS (103) by the source WLAN BS (103);

establishing an LTE connection after completing attach procedure by the UE (102);

configuring the GW to create data flow for the UE (102) towards the target LTE BS (103);

deleting old data flows towards the source WLAN BS (103);

inserting an end marker packet as the last packet towards the source WLAN BS (103) in DL by the GW, before deleting the old DL flow;

forwarding all UE specific UL data towards the target LTE BS (103) by the source WLAN BS (103) using a forwarding tunnel;

inserting an end marker packet at the end to indicate the completion of transfer of all UE specific UL data by the WLAN BS (103);

deleting a UL data flow path for the UE (102) by the source WLAN BS (103);

forwarding an end marker notification received by the target LTE BS (103) to the WNC (101);

deleting the forwarding data flows between the target LTE BS (103) and the source WLAN BS (103) for the UE (102) by the WNC (101); and transferring of buffered and new UL/DL data from/to the UE (102) by the target LTE BS (103).

20. A communication system comprising a Wireless Network Controller (WNC) (101) configured for managing communication for at least one device connected to a plurality of Radio Access Technologies (RATs), wherein the plurality of RATs comprise of at least one data plane node (103), wherein the at least one data plane node (103) in a RAT is configured for forwarding control plane messages to the WNC (101), upon the at least one data plane node (103) receiving the control plane messages; and managing user plane data, wherein the at least one data plane node (103) manages the user plane data by forwarding the user plane data to at least one UE (102) and other data plane nodes (103), wherein the (WNC) (101) is further configured for receiving control plane messages from the at least one data plane node (103);

managing control plane data, upon receiving the control plane messages from the at least one data plane node (103), wherein the WNC (101) manages the control plane data by exchanging at least one control plane message with at least one entity, wherein the entity is at least one of other peer controllers, gateways and control plane nodes of other RATS; and managing the at least one data plane node (103) by providing at least one configuration to the data plane nodes (103) for the flow of data through the data plane nodes (103).

21. The WNC, as claimed in claim 20, wherein the WNC (101) further comprises a Software Defined Networking (SDN) middleware (401), a RAT specific control layer (402) for each RAT supported by the WNC (101), and an application layer (403), wherein the SDN middleware (401) comprises a RAT abstraction module (401*a*); a flow configuration module (401*b*); and an interface (401*c*) towards peer controllers, gateways and control plane nodes of other RATS.

22. The WNC, as claimed in claim 21, wherein the RAT abstraction module (401*a*) is configured for translating RAT specific details into a message format.

23. The WNC, as claimed in claim 22, wherein the flow configuration module (401*b*) is configured for configuring and setting-up traffic flows using the translated message format.

* * * * *